(12) United States Patent
Zheng et al.

(10) Patent No.: US 7,785,907 B2
(45) Date of Patent: Aug. 31, 2010

(54) METHOD FOR MANUFACTURING CATHODE ASSEMBLY OF FIELD EMISSION DISPLAY

(75) Inventors: Zhi Zheng, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 971 days.

(21) Appl. No.: 11/556,393

(22) Filed: Nov. 3, 2006

(65) Prior Publication Data
US 2007/0287350 A1 Dec. 13, 2007

(30) Foreign Application Priority Data
Jun. 9, 2006 (CN) ............ 2006 1 0061097

(51) Int. Cl.
*H01L 21/00* (2006.01)
(52) U.S. Cl. ............ 438/20; 257/21.085; 977/735; 977/742
(58) Field of Classification Search ............ 438/20; 445/24; 427/249.1; 977/935, 742
See application file for complete search history.

(56) References Cited

U.S. PATENT DOCUMENTS

| | | | |
|---|---|---|---|
| 6,062,931 A | 5/2000 | Chuang et al. | |
| 6,440,763 B1 * | 8/2002 | Hsu | 438/20 |
| 7,081,030 B2 | 7/2006 | Liu et al. | |
| 7,501,146 B2 * | 3/2009 | Lee et al. | 427/77 |
| 2005/0236963 A1 * | 10/2005 | Kang et al. | 313/495 |
| 2006/0066217 A1 * | 3/2006 | Son | 313/497 |
| 2006/0275966 A1 * | 12/2006 | Park et al. | 438/182 |
| 2007/0099336 A1 * | 5/2007 | Weston et al. | 438/99 |
| 2010/0009474 A1 * | 1/2010 | Kim et al. | 438/20 |

FOREIGN PATENT DOCUMENTS

| | | |
|---|---|---|
| CN | 1532866 | 9/2004 |
| CN | 1585067 | 2/2005 |

* cited by examiner

*Primary Examiner*—Savitri Mulpuri
(74) *Attorney, Agent, or Firm*—Jeffrey T. Knapp

(57) ABSTRACT

A method for manufacturing a cathode assembly of a field emission display, includes the steps of: providing a substrate (110) with a cathode (113) formed thereon; forming an electrically insulating layer (120), a gate electrode layer (130) and a photoresist layer (140) on a cathode in series; defining at least one opening (141) in the photoresist layer using a photolithographic process; etching the gate electrode layer through the at least one opening so as to form at least one gate electrode opening (131) in the gate electrode layer; etching the electrically insulating layer to define at least one cavity (121) in the electrically insulating layer; pressing the photoresist layer in a manner such that a size of the at least one opening is reduced; depositing a catalyst layer (170) in the at least one cavity through the at least one opening; and growing carbon nanotubes (180) on the catalyst layer.

15 Claims, 10 Drawing Sheets

METHOD FOR MANUFACTURING CATHODE ASSEMBLY OF FIELD EMISSION DISPLAY

CROSS REFERENCE TO RELATED APPLICATION

This application is related to a commonly-assigned copending application Ser. No. 11/556,641, entitled "CARBON NANOTUBE FIELD EMISSION DEVICE AND METHOD FOR MANUFACTURING SAME", filed Nov. 3, 2006.

BACKGROUND OF THE INVENTION

1. Field of the Invention

The present invention relates to methods for manufacturing cathode assemblies of field emission displays and, more particularly, to a method for manufacturing a cathode assembly containing carbon nanotubes as electron emitters.

2. Description of Related Art

Field emission displays (FEDs) are a new, rapidly developing kind of flat panel display technology. Compared to conventional technologies, e.g., cathode-ray tube (CRT) and liquid crystal display (LCD) technologies, FEDs are superior in having a wider viewing angle, low energy consumption, smaller size, and higher quality display. In particular, carbon nanotube-based FEDs (CNTFEDs) have attracted much attention in recent years.

Carbon nanotube-based FEDs employ carbon nanotubes (CNTs) as electron emitters. Carbon nanotubes are very small tube-shaped structures essentially composed of a graphite material. That carbon nanotubes can be produced by arc discharge between graphite rods was first discovered and reported in an article by Sumio Iijima, entitled "Helical Microtubules of Graphitic Carbon" (Nature, Vol. 354, Nov. 7, 1991, pp. 56-58). Carbon nanotubes can have an extremely high electrical conductivity, very small diameters (much less than 100 nanometers), large aspect ratios (i.e. with length/diameter ratios potentially greater than 1000), and a tip-surface area near the theoretical limit (the smaller the tip-surface area, the more concentrated the electric field, and the greater the field enhancement factor). Thus, carbon nanotubes can transmit an extremely high electrical current and have a very low electric field electron emission activation voltage (approximately 2 volts/micron). In summary, carbon nanotubes are one of the most favorable candidates for electrons emitters in electron emission devices and can play an important role in field emission display applications.

A conventional cathode assembly includes a cathode supporter and a number of carbon nanotubes used as an electron emitter. The number of carbon nanotubes are formed on the cathode supporter. Conventional methods for forming the carbon nanotubes on the cathodes supporter mainly include a mechanical method and a growing method.

The mechanical method glues the carbon nanotubes on the cathode supporter by chemical adhesive. The mechanical method is simple, but it is more difficult to operate and requires more time. Especially, if the diameter of the carbon nanotubes is less than 1 nm, the mechanical method is impossible to operate.

A conventional growing method is plating a metal catalyst on the cathode supporter, then growing carbon nanotubes directly on the cathode supporter using a chemical vapor deposition method or an arc discharge method. However, for a triode type field emission display, the metal catalyst is plated on the cathode supporter through gate holes defined between every two adjacent gate electrodes, therefore, the length of the metal catalyst is the same as the gate holes. If the carbon nanotubes are grown too high, the carbon nanotubes arranged at the periphery will contact with the gate electrodes and a short circuit takes place between a cathode electrode and the gate electrode. Furthermore, part of the electrons emitted from the carbon nanotubes will be transmitted to the gate electrode to creep and decrease the power utilization efficiency.

What is needed, therefore, is a method for manufacturing a cathode assembly of a high-performance field emission display.

SUMMARY OF THE INVENTION

A method for manufacturing a cathode assembly of a field emission display in accordance with a preferred embodiment, includes the steps of: providing a substrate; forming a cathode on the substrate; forming an electrically insulating layer on the cathode; forming a gate electrode layer on the electrically insulating layer; forming a photoresist layer on the electrode layer; defining at least one opening in the photoresist layer using a photolithographic process; etching the gate electrode layer through the at least one opening in the photoresist layer so as to form at least one gate electrode opening in the gate electrode layer; etching the electrically insulating layer to define at least one cavity in the electrically insulating layer; pressing the photoresist layer in a manner such that a size of the at least one opening in the photoresist layer is reduced; depositing a catalyst layer on the substrate in the at least one cavity through the at least one opening; and growing carbon nanotubes on the catalyst layer.

The method deposits the catalyst layer through the at least one opening defined by the pressed photoresist layer. Since the at least one gate electrode opening is larger than the at least one opening in the pressed photoresist layer, the catalyst layer is smaller than the at least one gate electrode opening, and a region of the grown carbon nanotubes from the catalyst layer is smaller than the at least one gate electrode opening. Therefore, the cathode assembly efficiently prevents carbon nanotubes contacting with the gate electrode layer. The probability of shorting between the gate electrode layer and the carbon nanotubes is thus decreased. Furthermore, the probability of electrons emitted from the carbon nanotubes being transmitted to the gate electrode layer is decreased. The method is simple and can be performed without using additional material, and as a result the cost is low.

Other advantages and novel features will become more apparent from the following detailed description of present method for manufacturing a cathode assembly of a field emission display, when taken in conjunction with the accompanying drawings.

BRIEF DESCRIPTION OF THE DRAWINGS

Many aspects of the present method for manufacturing a cathode assembly of a field emission display can be better understood with reference to the following drawings. The components in the drawings are not necessarily drawn to scale, the emphasis instead being placed upon clearly illustrating the principles of the present method for manufacturing a cathode assembly of a field emission display. Moreover, in the drawings, like reference numerals designate corresponding parts throughout the several views.

DETAILED DESCRIPTION OF THE INVENTION

Reference will now be made to the drawings to describe a preferred embodiment of the present method for manufacturing a cathode assembly of a field emission display, in detail.

Figure 1:
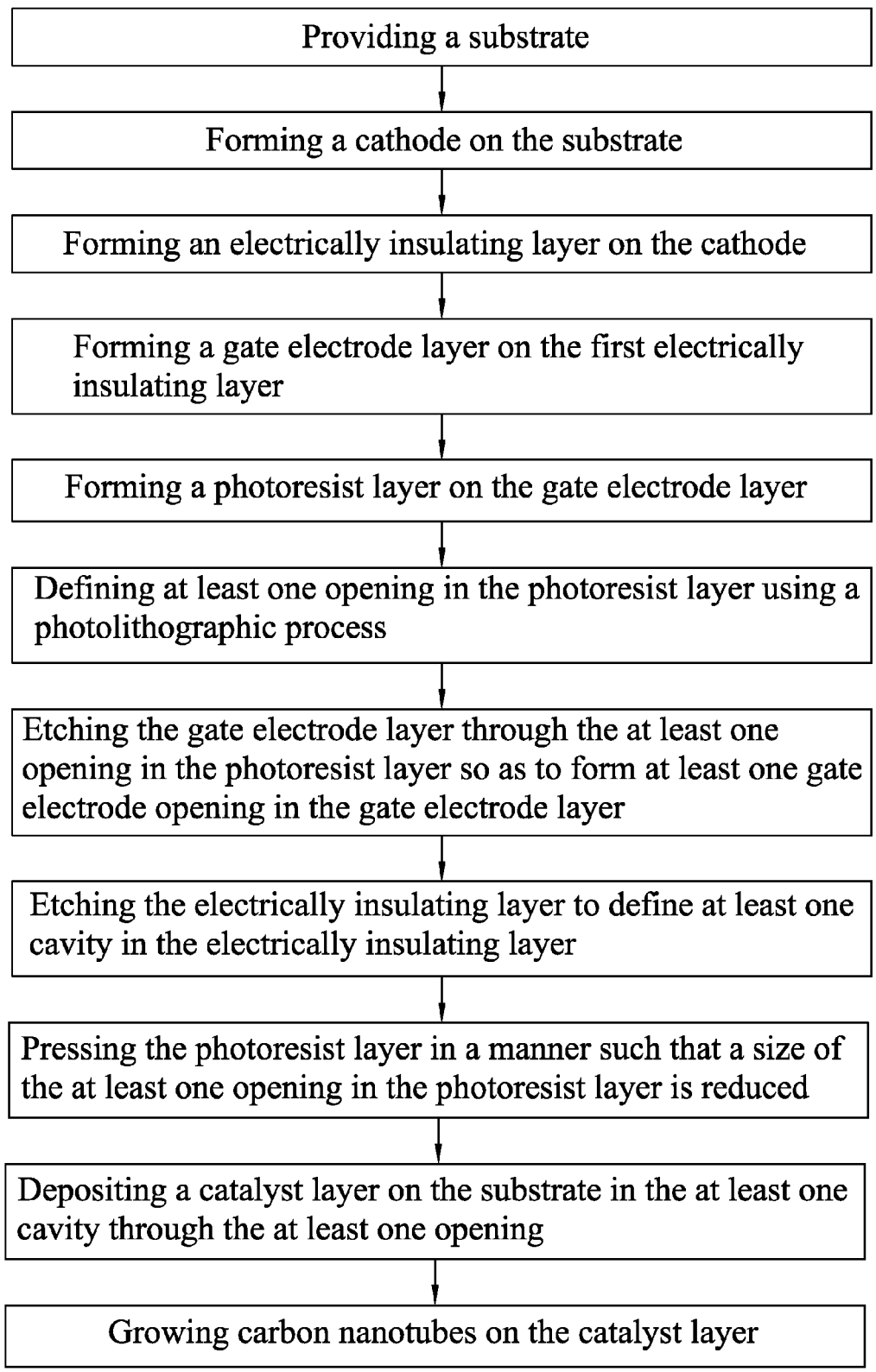
FIG. 1 is a flow chart of a method for manufacturing a cathode assembly of a field emission display in accordance with a first preferred embodiment.

Referring to FIG. 1, a method for manufacturing a cathode assembly of a field emission display in accordance with a first preferred embodiment, includes the steps of:

providing a substrate;
forming a cathode on the substrate;
forming an electrically insulating layer on the cathode;
forming a gate electrode layer on the first electrically insulating layer;
forming a photoresist layer on the gate electrode layer;
defining at least one opening in the photoresist layer using a photolithographic process;
etching the gate electrode layer through the at least one opening in the photoresist layer so as to form at least one gate electrode opening in the gate electrode layer;
etching the electrically insulating layer to define at least one cavity in the electrically insulating layer;
pressing the photoresist layer in a manner such that a size of the at least one opening in the photoresist layer is reduced;
depositing a catalyst layer on the substrate in the at least one cavity through the at least one opening; and
growing carbon nanotubes on the catalyst layer.

Figure 2:
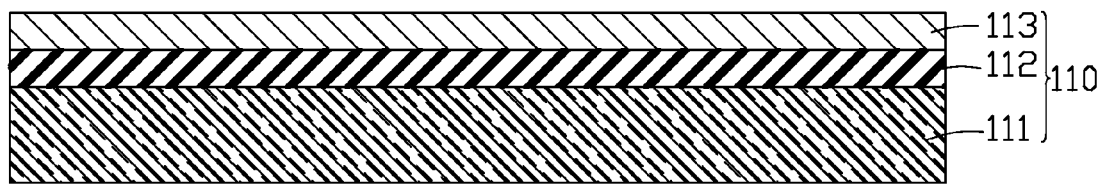
FIG. 2 is a schematic, cross-sectional view of a substrate with a cathode formed thereon used in the method of FIG. 1.

Referring to FIG. 2, a substrate 110 with a cathode 113 formed thereon is provided. The substrate 110 is a glass substrate 111 with an electrically insulating layer 112 thereon. The cathode 113 is comprised of metal material.

Alternatively, the substrate 110 may be comprised of transparent conducting material, such as indium tin oxide (ITO) or indium zinc oxide (IZO), etc. In which case the substrate 110 can be directly used as a cathode.

Figure 3:
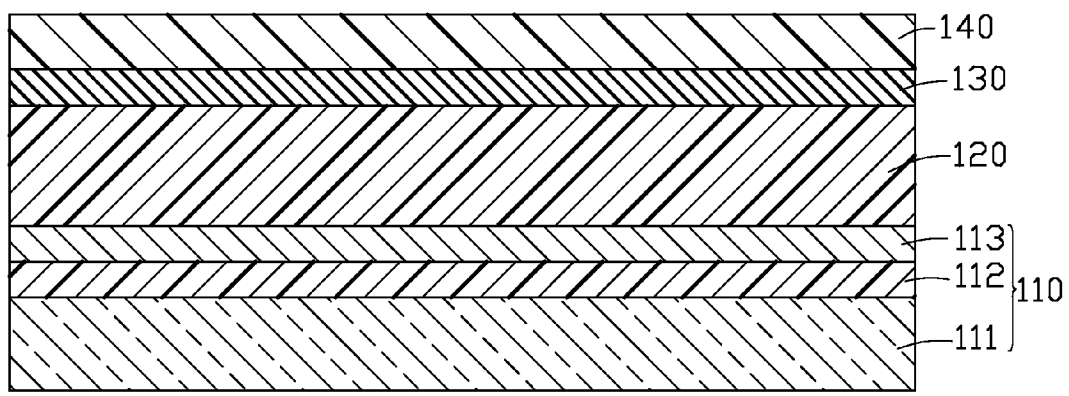
FIG. 3 is similar to FIG. 1, but showing an electrically insulating layer, a gate electrode layer and a photoresist layer formed on the substrate of FIG. 2.

Referring to FIG. 3, an electrically insulating layer 120 is formed on the cathode 113, a gate electrode layer 130 is formed on the electrically insulating layer 120, and a photoresist layer 140 is formed on the gate electrode layer 130.

The electrically insulating layer 120 is used to form an insulating layer between the cathode 113 and the gate electrode layer 130. The electrically insulating layer 120 can be deposited on the substrate 110 by methods involving evaporation, printing, etc. The electrically insulating layer 120 has a thickness in an approximate range from 1 micrometer to 1000 micrometers. Preferably, the thickness of the electrically insulating layer 120 is in an approximate range from 10 micrometers to 200 micrometers. The electrically insulating layer 120 is comprised of a material capable of resisting high temperatures of about 700 degrees centigrade, such as high temperature glass, silicon, silicon oxide, ceramic, or mica, etc.

The gate electrode layer 130 is insulated from the cathode 113 through the electrically insulating layer 120 and is used to form gate electrodes.

The photoresist layer 140 is formed on the gate electrode layer 130 to be used as a mask.

Figure 4:
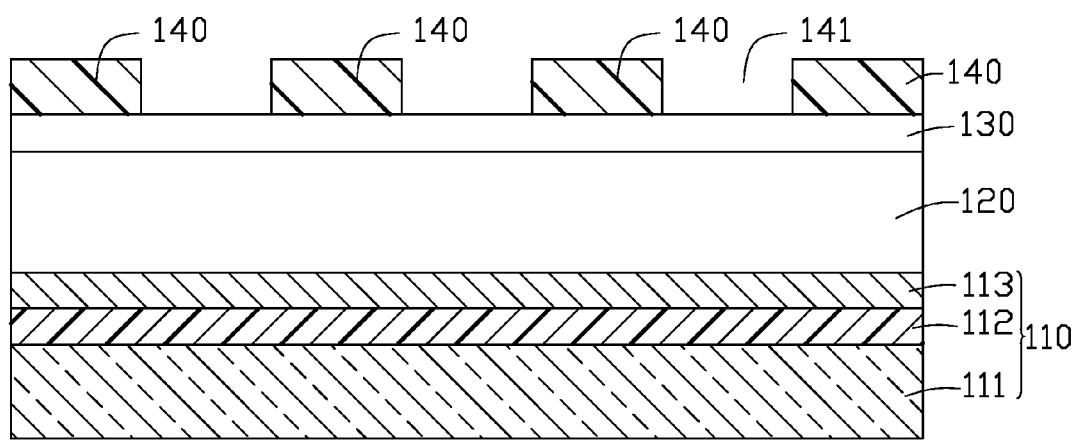
FIG. 4 is similar to FIG. 3, but showing the photoresist layer developed to form at least one opening on the gate metal layer of FIG. 3.

Referring to FIG. 4, at least one opening 141 in the photoresist layer 140 is defined by using a photolithographic process.

The at least one opening 141 in the photoresist layer 140 is formed and the remaining photoresist layer 140 forms a pattern corresponding to the designed gate electrodes. Advantageously, the remaining photoresist layer 140 has an area corresponding to the designed gate electrodes.

Figure 5:
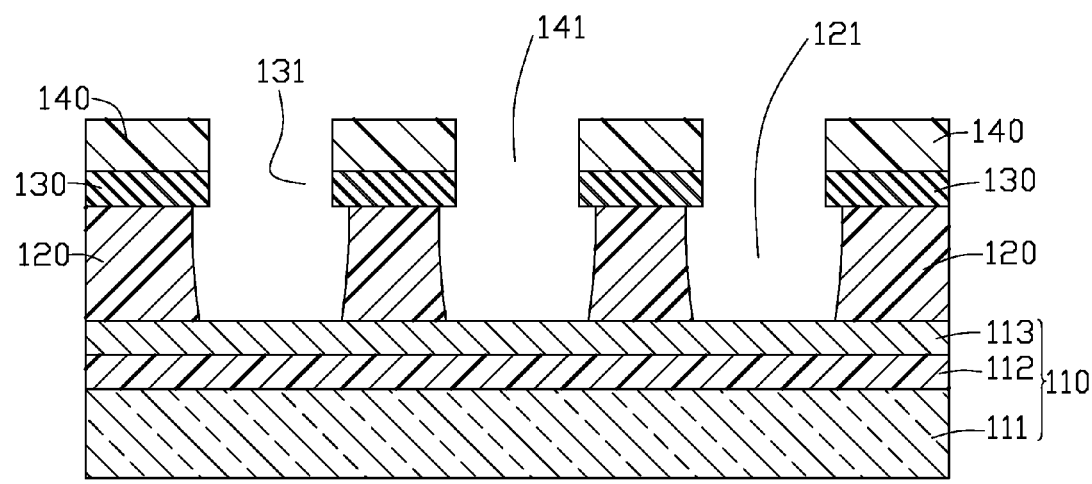
FIG. 5 is similar to FIG. 4, but showing the gate electrode layer and the electrically insulating layer etched to form at least one gate electrode opening and at least one cavity on the substrate of FIG. 4.

Referring to FIG. 5, the gate electrode layer 130 and the electrically insulating layer 120 both undergo etching.

The gate electrode layer 130 can be etched using dry etching methods. The photoresist layer 140 can be used as a mask in the dry etching process, and at least one gate electrode opening 131 corresponding to the at least one opening 141 in the photoresist layer 140 can be formed in this way. The obtained gate electrode layer 130 serves as the gate electrodes. The electrically insulating layer 120 can be etched using wet etching methods. The photoresist layer 140 and the gate electrode layer 130 can be used as a mask in the wet etching process, and can be used to define at least one cavity 121. The obtained electrically insulating layer 120 serves as the spacer.

Figure 6:
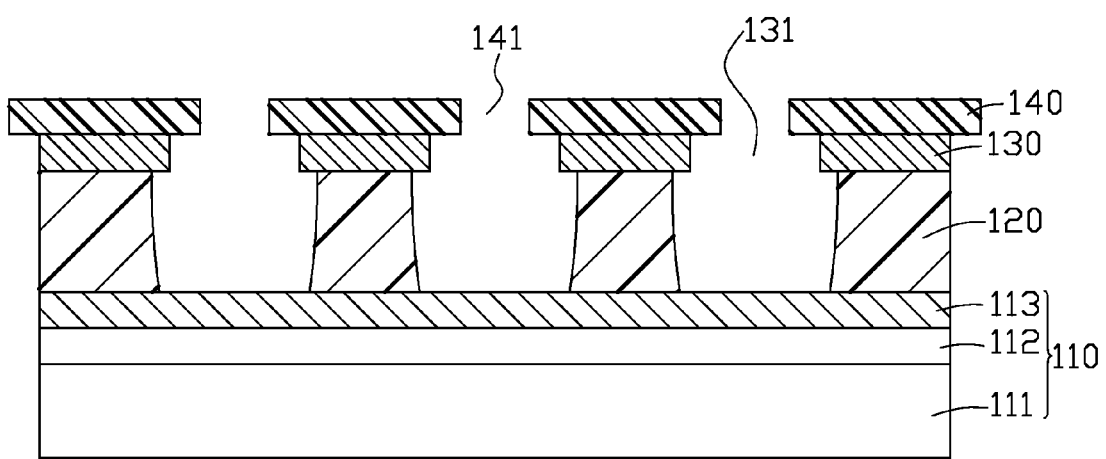
FIG. 6 is similar to FIG. 5, but showing the photoresist layer pressed in a manner such that a size of the at least one opening in the photoresist layer is reduced.

Referring to FIG. 6, the photoresist layer 140 is pressed in a manner such that a size of the at least one opening 141 in the photoresist layer 140 is reduced.

The photoresist layer 140 is softened by heating and then is pressed to decrease its thickness and increase its area and the at least one opening 141 in the photoresist layer 140 is reduced as a result. Compared with the at least one gate electrode opening 131, a size of the at least one opening 141 in the photoresist layer 140 is smaller than a size of the gate electrode opening 131.

Figure 7:
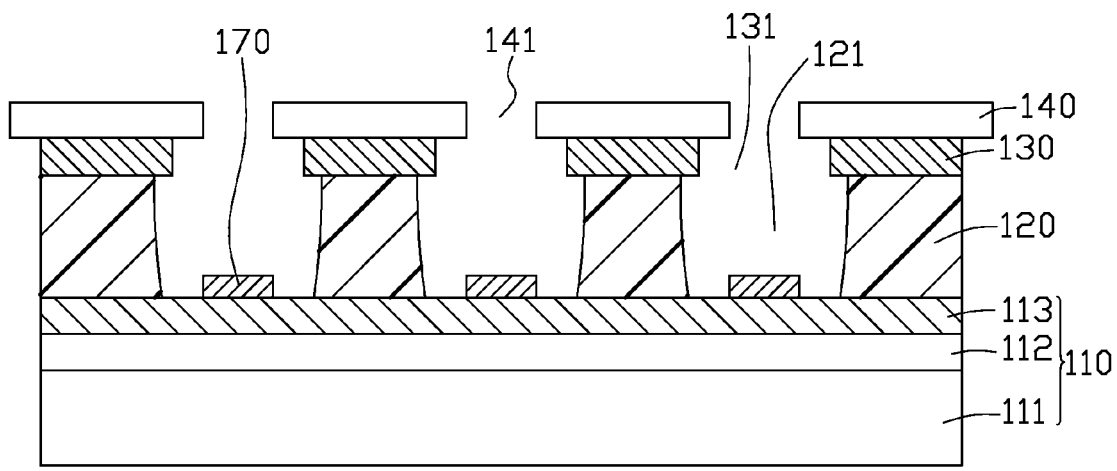
FIG. 7 is similar to FIG. 6, but showing a catalyst layer evaporated on the substrate of FIG. 6.

Referring to FIG. 7, a catalyst layer 170 is deposited on the substrate 110 in the at least one cavity 121 through the at least one opening 141 in the photoresist layer 140.

The catalyst layer 170 is comprised of a material selected from a group consisting of iron (Fe), cobalt (Co), nickel (Ni), and any alloys thereof. The catalyst layer 170 has a thickness in an approximate range from 1 nanometer to 10 nanometers. Preferably, the thickness of the catalyst layer 170 is in an approximate range from 3 to 5 nanometers. Furthermore, since the size of the at least one opening 141 in the photoresist layer 140 is smaller than the at least one gate electrode opening 131, the catalyst layer 170 in the at least one cavity 121 is smaller than the at least one gate electrode opening 131.

Figure 8:
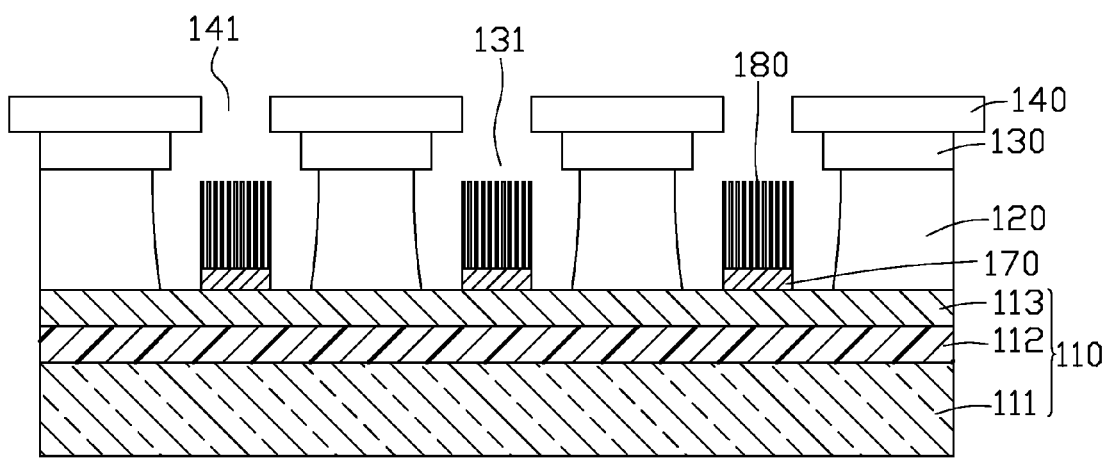
FIG. 8 is similar to FIG. 7, but showing carbon nanotubes grown from the catalyst layer of FIG. 7.

Referring to FIG. 8, carbon nanotubes 180 are grown on the catalyst layer 170.

The carbon nanotubes 180 are grown by chemical vapor deposition methods and have an growing area similar to the metal catalyst layers 170. Therefore, the growing area of the carbon nanotubes 180 is smaller than the gate electrode opening 131.

Figure 9:
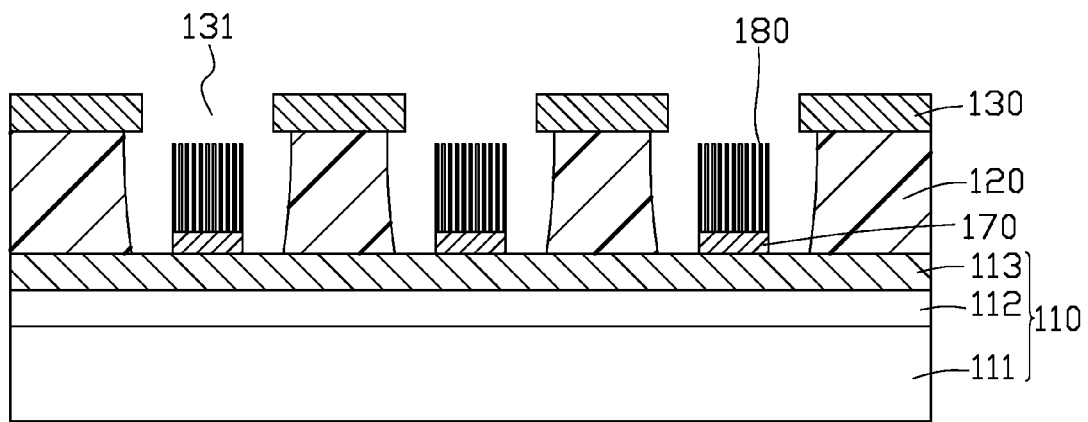
FIG. 9 is similar to FIG. 8, but with the pressed photoresist layers removed from the substrate of FIG. 8.

Referring to FIG. 9, the method for manufacturing the cathode assembly of the field emission display further includes a step of removing the photoresist layer 140 The step of removing the photoresist layer 140 may be performed before or after the step of growing the carbon nanotubes 180 on the catalyst layer 170.

Compared with the conventional method for manufacturing the cathode assembly of the field emission display, the present method has many advantages. Since the catalyst layer 170 is deposited through the opening 141 in the photoresist layer 140, the catalyst layer 170 is smaller than the gate electrode opening 131, and the grown carbon nanotubes 180 from the catalyst layer 170 have a growing area smaller than the gate electrode opening 131, therefore the cathode assembly prevents carbon nanotubes 180 from contacting with the gate electrode layer 130. The probability of short circuit between the gate electrode layer 130 and the carbon nanotubes 180 is eliminated. Furthermore, the probability of electron emitted from the carbon nanotubes 180 transmitting to the gate electrode layer 130 is decreased. The method is simple and costs less since no any other material is used and no additional steps are needed.

Figure 10:
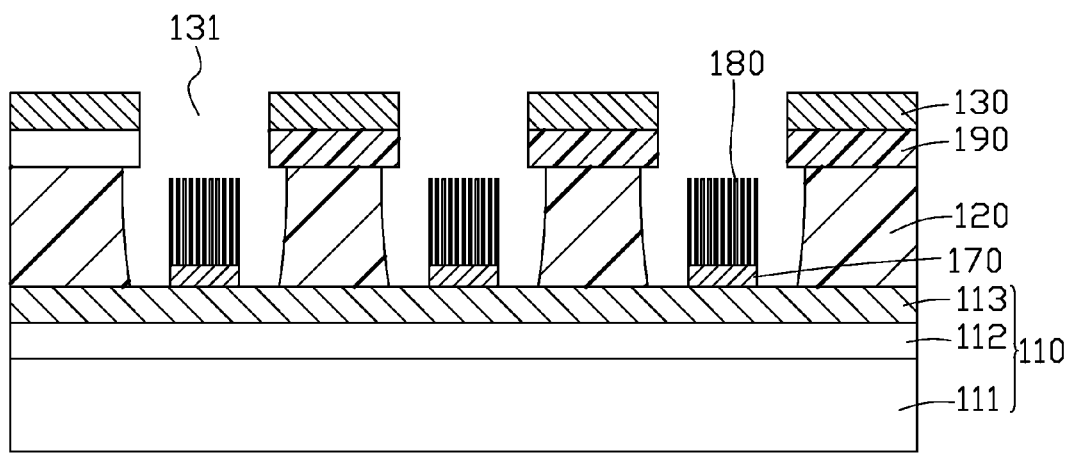
FIG. 10 is a schematic, cross-sectional view of a cathode assembly of a field emission display in accordance with a second preferred embodiment.

Referring to FIG. 10, a cathode assembly of a field emission display in accordance with a second preferred embodiment is shown. The above cathode assembly is made by a method similar to the first embodiment, except that the method further includes steps of forming an insulating layer 190 between the gate electrode layer 130 and the electrically insulating layer 120. The method is described in the commonly-assigned copending application Ser. No. 11/556,641, entitled "CARBON NANOTUBE FIELD EMISSION DEVICE AND METHOD FOR MANUFACTURING SAME". The insulating layer 190 is made of a material different to the electrically insulating layer 120. The insulating layer 190 may be made of silicon nitride. The insulating layer 190 can further prevent carbon nanotubes 180 from contacting with the gate electrode layer 130.

It is to be understood that the above-described embodiment is intended to illustrate rather than limit the invention. Variations may be made to the embodiment without departing from the spirit of the invention as claimed. The above-described embodiments are intended to illustrate the scope of the invention and not restricted to the scope of the invention.

What is claimed is:

1. A method for manufacturing a cathode assembly of a field emission display, comprising the steps of:
    providing a substrate;
    forming a cathode on the substrate;
    forming an electrically insulating layer on the cathode;
    forming a gate electrode layer on the electrically insulating layer;
    forming a photoresist layer on the gate electrode layer;
    defining at least one opening in the photoresist layer using a photolithographic process;
    etching the gate electrode layer through the at least one opening in the photoresist layer so as to form at least one gate electrode opening in the gate electrode layer;
    etching the electrically insulating layer to define at least one cavity in the electrically insulating layer;
    pressing the photoresist layer in a manner such that a thickness of the photoresist layer is decreased and an area of the photoresist layer is increased such that a size of the at least one opening in the photoresist layer is smaller than a size of the at least one gate electrode opening, wherein the photoresist layer is softened by heating before it is pressed;
    depositing a catalyst layer on the substrate in the at least one cavity through the at least one opening; and
    growing carbon nanotubes on the catalyst layer.

2. The method as claimed in claim 1, wherein the substrate is a glass substrate with an electrically insulating layer thereon, the cathode electrode being formed on the electrically insulating layer of the substrate.

3. The method as claimed in claim 1, wherein the substrate is comprised of transparent conducting material.

4. The method as claimed in claim 3, wherein the substrate is comprised of a material selected from a group consisting of indium tin oxide and indium zinc oxide.

5. The method as claimed in claim 1, wherein the electrically insulating layer has a thickness in an approximate range from 1 micrometer to 1000 micrometers.

6. The method as claimed in claim 5, wherein the thickness of the electrically insulating layer is in an approximate range from 10 micrometers to 200 micrometers.

7. The method as claimed in claim 1, wherein the electrically insulating layer is comprised of a material selected from a group consisting of glass, silicon, silicon oxide, ceramic, and mica.

8. The method as claimed in claim 1, wherein the gate electrode layer is etched by a dry etching method.

9. The method as claimed in claim 1, wherein the electrically insulating layer is etched by a wet etching method.

10. The method as claimed in claim 1, wherein a size of the at least one gate electrode opening is larger than a size of the opening in the photoresist layer.

11. The method as claimed in claim 1, wherein the catalyst layer is comprised of a material selected from a group consisting of iron, cobalt, nickel, and any combination alloy thereof.

12. The method as claimed in claim 1, wherein the catalyst layer has a thickness in an approximate range from 1 nanometer to 10 nanometers.

13. The method as claimed in claim 11, wherein the catalyst layer has a thickness in an approximate range from 3 nanometers to 5 nanometers.

14. The method as claimed in claim 1, further comprising a step of removing the pressed photoresist layer.

15. The method as claimed in claim 1, further comprising a step of forming an insulating layer between the gate electrode layer and the electrically insulating layer, and the insulating layer is comprised of a material different from the electrically insulating layer.

* * * * *